May 12, 1942.  C. KREUTZER  2,282,523
METHOD OF MANUFACTURING SELENIUM RECTIFIERS
AND PHOTO-ELECTRIC SELENIUM CELLS
Filed Nov. 9, 1939

Inventor:
Conradin Kreutzer
by E.D.Kinney
Att'y

Patented May 12, 1942

2,282,523

UNITED STATES PATENT OFFICE 2,282,523

METHOD OF MANUFACTURING SELENIUM RECTIFIERS AND PHOTOELECTRIC SELENIUM CELLS

Conradin Kreutzer, Nuremberg, Germany, assignor to Süddeutsche Apparate - Fabrik, Nuremberg, Germany, a company Application November 9, 1939, Serial No. 303,545
In Germany January 13, 1939

6 Claims. (Cl. 175—366)

The invention relates to the manufacture of selenium rectifiers and photo-electric selenium cells. More particularly, the invention is concerned with manufacturing methods of the kind in which the selenium layer to be applied to the electrodes of these devices is united therewith by means of an auxiliary disc after the electrodes have been heated. This disc is removed afterwards.

According to the invention such auxiliary disc, selenium and electrodes are employed only if they are free from gaseous admixtures.

Figure 1:
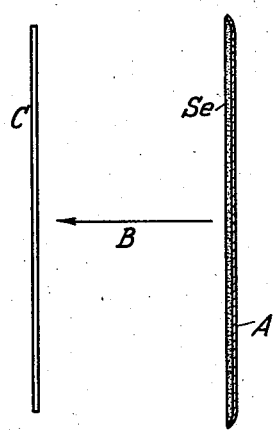
Figure 2:

This is explained hereafter with reference to the accompanying drawing, in which Fig. 1 is a partially sectioned diagrammatic representation illustrating one step of the method improved by the invention, Fig. 2 is a side view of a finished product.

With the method improved by the invention the selenium Se while in its amorphous state is firmly arranged on an auxiliary disc A and is by means of this disc applied to the heated electrode C, as indicated by arrow B. Disc A is removed after the selenium has undergone the well known formation process of heating and forming.

It has been found that after the formation process there are small holes in the selenium layer which hence is thin or interrupted at these spots, whereby short-circuits can arise. Such holes are produced by gas bubbles of different origin. Some of these bubbles may be freed from the surface of the disc A during the formation process and act on the plastic selenium in a manner to produce impressions, pockets, or voids therein. Also, gases contained in the selenium are set free on heating it. These come together to form bubbles by which the selenium layer is rendered porous. Equally, gases that leave the electrode C act to produce hollows in the selenium layer. As a result the selenium may happen to be brought out of engagement with the electrode either in part or entirely.

Under the invention, these disadvantages are overcome by the expedient of carrying out the manufacturing process when the parts A, Se, C are in a substantially outgassed condition, that is, free from gaseous admixtures. Accordingly, the invention provides for liberating from these parts whatever gas may not have been liberated therefrom, either entirely or in part, in the course of manufacturing or purifying them.

This outgassing may be effected in accordance with any known method by heating. When heating the metal parts A, C it will be of advantage not to exceed a temperature of 500° C. In fact, part A in most cases is of aluminium and therefore has a melting point hardly higher than 500° C., and part C in its turn presents roughenings which should be sharp-edged but will lose in sharpness when heated by temperatures higher than 500° C. A particularly quick outgassing will be obtained by the use of a vacuum in which the parts are heated, and the outgassing so effected will be the quicker the higher the vacuum. It has been found, however, that a vacuum of about 10 millimeters of mercury-column, is sufficient, that is, a vacuum produced by means of a water-jet pump.

What is claimed is:

1. The method of manufacturing selenium-coated electrical devices of the general character indicated, which includes applying amorphous selenium to an auxiliary member, heating an electrode member, applying a selenium-coated side of said auxiliary member to said electrode member, subjecting the selenium to a formation process, and then removing said auxiliary member, all of the above-mentioned steps being performed in a partial vacuum.

2. The method of manufacturing selenium-coated electrical devices, which includes applying amorphous selenium to an auxiliary member, heating an electrode member, outgassing said selenium-coated member by heating said selenium coated member in a partial vacuum of the order of 10 millimeters of mercury and said electrode member, applying a selenium-coated side of said auxiliary member to said electrode member, subjecting the selenium to a formation process, and then removing said auxiliary member.

3. The method of manufacturing selenium-coated electrical devices, which includes outgassing a quantity of amorphous selenium and outgassing an electrode member and an auxiliary member, said outgassing being performed by heating said selenium and said members in a partial vacuum, applying said amorphous selenium to said auxiliary member, heating said electrode member, applying a selenium-coated side of said auxiliary member to said electrode member, subjecting the selenium to a formation process, and then removing said auxiliary member.

4. The method of manufacturing selenium-coated electric devices having selenium layers supported by plate-shaped electrodes, which includes applying outgassed amorphous selenium to an outgassed auxiliary plate member, said selenium and said auxiliary member having been outgassed by heating in a partial vacuum, heating an outgassed electrode member, applying a selenium-coated side of said auxiliary plate member to said outgassed electrode, subjecting the selenium to a formation process, and then removing said auxiliary member.

5. The method of claim 1, wherein said partial vacuum is lower than 10 millimeters of mercury and said electrode member is heated to a temperature less than 500° C.

6. The method of claim 1 in which said partial vacuum is on the order of 10 millimeters of mercury.

CONRADIN KREUTZER.